(12) United States Patent
Chang et al.

(10) Patent No.: US 8,445,070 B2
(45) Date of Patent: May 21, 2013

(54) BIODEGRADABLE WATERPROOF PAPER AND MANUFACTURING METHOD FOR THE SAME

(75) Inventors: Ching-Hsin Chang, Yulin County (TW); Wen-Chih Wu, Taichung (TW)

(73) Assignee: Wei Mon Industry Co., Ltd., Hsinchu County (TW)

( * ) Notice: Subject to any disclaimer, the term of this patent is extended or adjusted under 35 U.S.C. 154(b) by 236 days.

(21) Appl. No.: 12/866,455

(22) PCT Filed: Jan. 15, 2009

(86) PCT No.: PCT/CN2009/000053
§ 371 (c)(1),
(2), (4) Date: Aug. 5, 2010

(87) PCT Pub. No.: WO2009/100641
PCT Pub. Date: Aug. 20, 2009

(65) Prior Publication Data
US 2010/0323212 A1    Dec. 23, 2010

(30) Foreign Application Priority Data

Feb. 5, 2008    (CN) .......................... 2008 1 0005824

(51) Int. Cl.
*B32B 23/04* (2006.01)
(52) U.S. Cl.
USPC ...... 427/384; 427/391; 427/428.02; 427/439; 428/532; 428/537.5
(58) Field of Classification Search
USPC ............... 428/532, 537.5; 427/384, 391, 439, 427/428.02
See application file for complete search history.

(56) References Cited

U.S. PATENT DOCUMENTS 7,132,490 B2 * 11/2006 Obuchi et al. .............. 526/317.1

* cited by examiner

*Primary Examiner* — Leszek Kiliman
(74) *Attorney, Agent, or Firm* — CKC & Partners Co., Ltd.

(57) ABSTRACT

A biodegradable waterproof paper coated with PLA film and the manufacturing method for the same are disclosed. The biodegradable waterproof paper includes a PLA film on at least one surface of the paper and the PLA film partially infiltrates into the fibers of the paper.

9 Claims, 5 Drawing Sheets

BIODEGRADABLE WATERPROOF PAPER AND MANUFACTURING METHOD FOR THE SAME

CROSS-REFERENCE TO RELATED APPLICATION

This application claims priority to PCT Application No. PCT/CN2009/000053, filed Jan. 15, 2009, which claims priority to CN Application No. 200810005824.2, filed Feb. 5, 2008.

BACKGROUND

1. Technical Field

The present disclosure relates to a waterproof paper. More particularly, the present disclosure relates to a biodegradable waterproof paper and a manufacturing method for the same.

2. Description of Related Art

To meet the increasing environmental consciousness, the issues of food safety and the disposable food packaging have become increasingly stringent. Replacing environmental-unfriendly materials (such as plastic, styrofoam, etc.) by biodegradable materials is a present trend to reduce the burden on the Earth's environment.

Since paper materials are not waterproof and greaseproof, the food contact surfaces of paper-based containers are usually coated by an insulation layer, such as wax, or PE film, to achieve the waterproof and greaseproof purposes.

Some biodegradable materials such as starch, and polylactic acid . . . etc. has been developed as lamination films to provide a waterproof or greaseproof layer of a paper material.

FIG. 1 is an operational scheme of prior art. The conventional polylactic acid (PLA) coated paper is manufactured by extruding method. In this method, PLA masterbatches (solid) are heated to form a hot molten PLA 200 (thick liquid) is directly extruded onto a chill roller 42, and then a paper 10 passed through the small space between the chill roller 42 and a pressure roller 41. Consequently, the molten PLA resin 200 is covered on the paper 10 to form a waterproof film 20 and the paper with waterproof film is collected by a roller 50. FIG. 2 is a cross-sectional view of a waterproof paper made by extruding method as described in FIG. 1. The waterproof paper made by extruding method includes a paper 10 and a PLA film 20 separately covered on surface of the paper 10.

Since the output of the molten PLA 200 is controlled by an extruding machine 30, the excess amount of the molten PLA 200 outputted from the extruding machine 30 is necessary for controlling the biodegradable film uniformity, so that the PLA consumption is increased and an unnecessary thicker biodegradable film is obtained. Furthermore, since the PLA coated film is laminated onto the paper surface by heat and pressure, so that only weak adhesion strength between the PLA coated film and the paper. If the conventional PLA coated paper is applied to reuse bags, such as drug bags, or fruit bags, the PLA coated film may be peeled from the paper bags because the insufficient adhesion strength between the PLA coated film and the paper of the paper bags.

SUMMARY

In one aspect of the disclosure is directed to a biodegradable waterproof paper.

According to one embodiment of the present disclosure, the biodegradable waterproof paper includes a PLA film coated on at least one surface of a paper and partially infiltrating in the fibers of the paper. The PLA film is formed by a PLA solution diluted from a stock solution includes 1-85 wt % of polylactic acid, and 15-99 wt % of a solvent.

In another aspect of the disclosure is directed to a method for manufacturing a biodegradable waterproof paper. The method includes following steps.

At least one portion of a roller is immersed into a PLA solution. The PLA solution is transferred onto a surface of a paper and absorbed into the fibers of the paper by moving the roller.

In one embodiment of the disclosure, for reducing the thickness of the PLA film, the excess PLA solution is scraped from the roller or surface of the paper by a scrape.

These and other features, aspects, and advantages of the present disclosure will become better understood with reference to the following description and appended claims.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
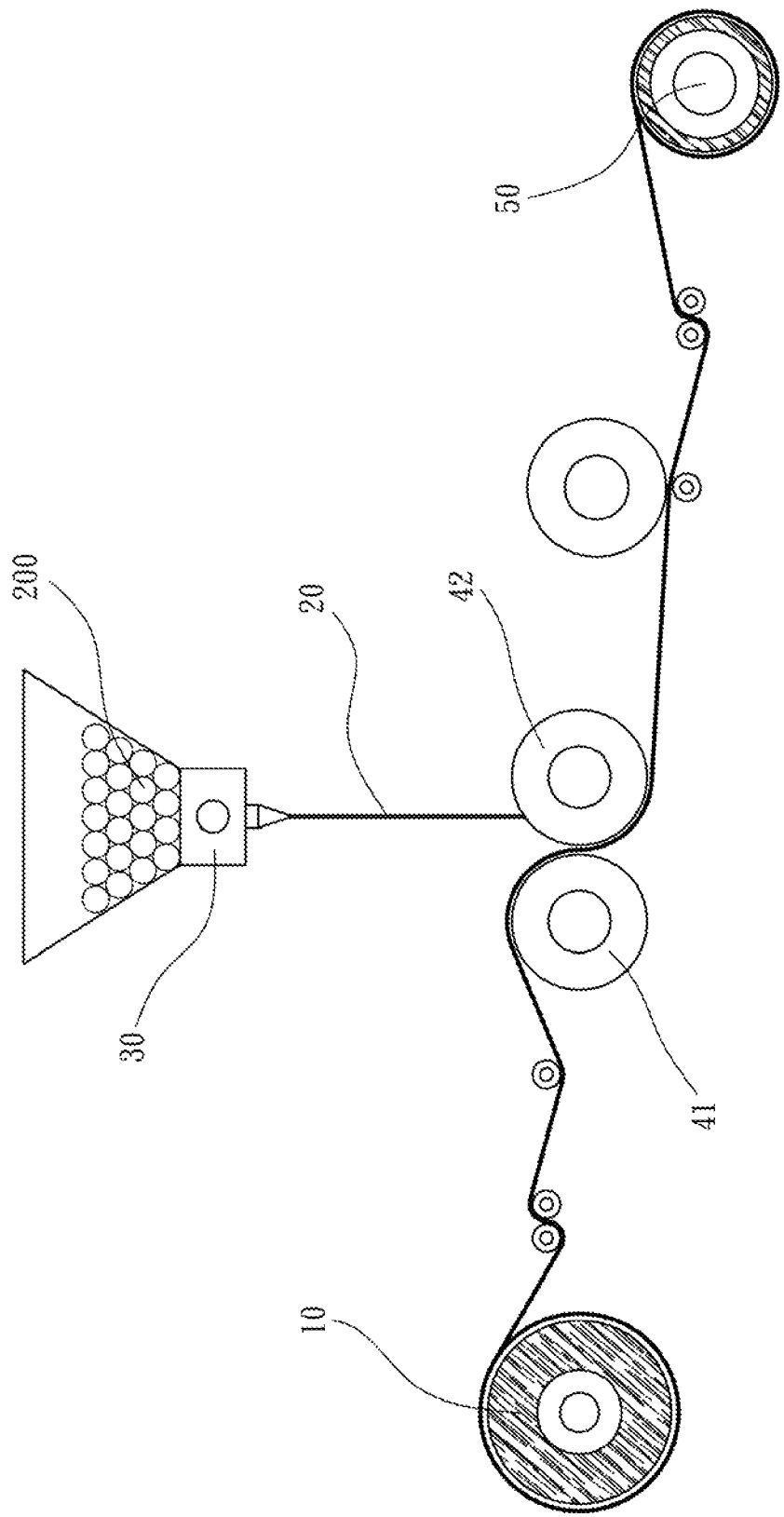
FIG. 1 is an operational scheme of prior art.
Figure 2:
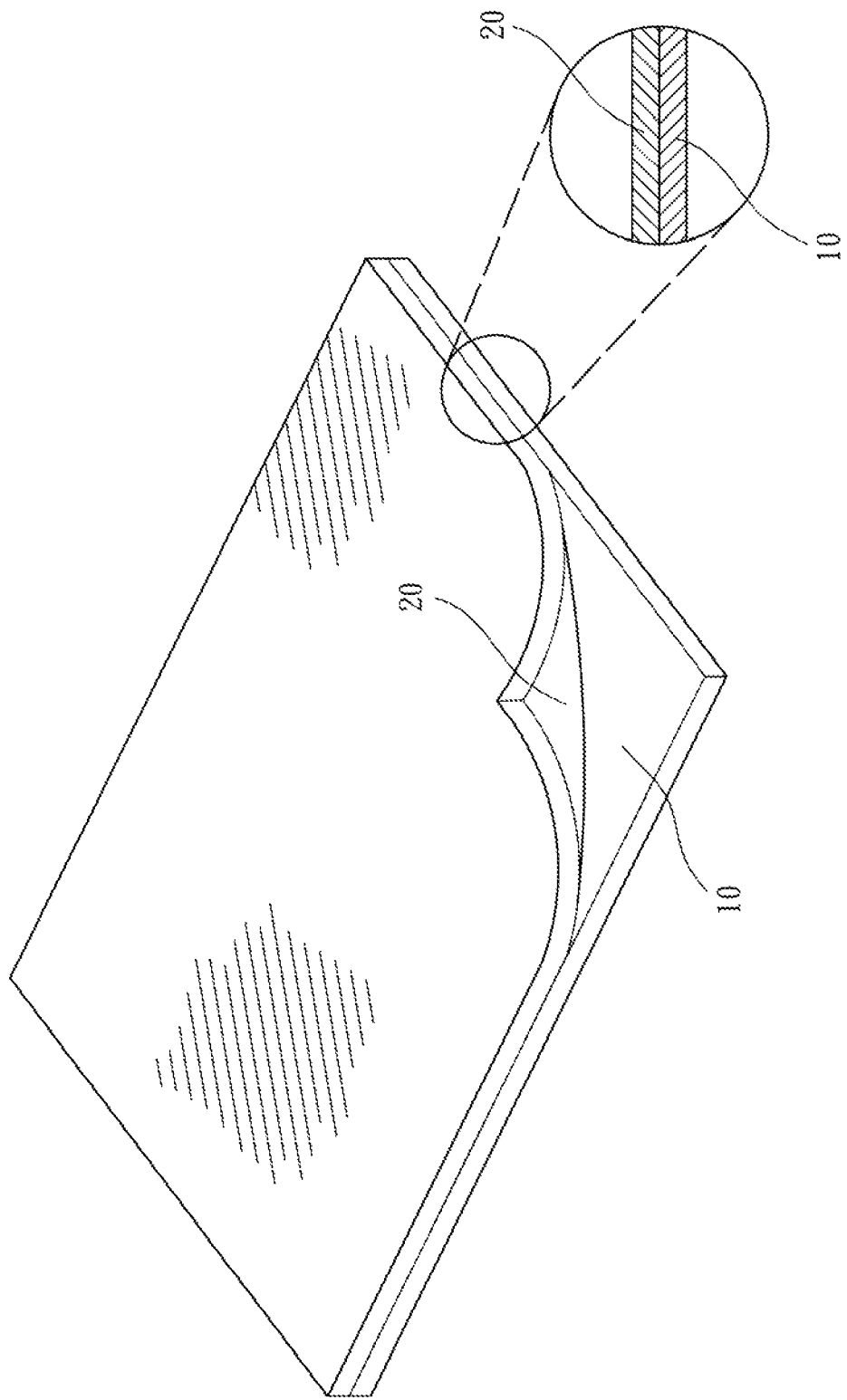
FIG. 2 is a cross-sectional view of a waterproof paper made by extruding method as described in FIG. 1.

Reference will now be made in detail to the present embodiments of the disclosure, examples of which are illustrated in the accompanying drawings. Wherever possible, the same reference numbers are used in the drawings and the description to refer to the same or like parts.

Structure of Biodegradable Waterproof Paper

Figure 3:
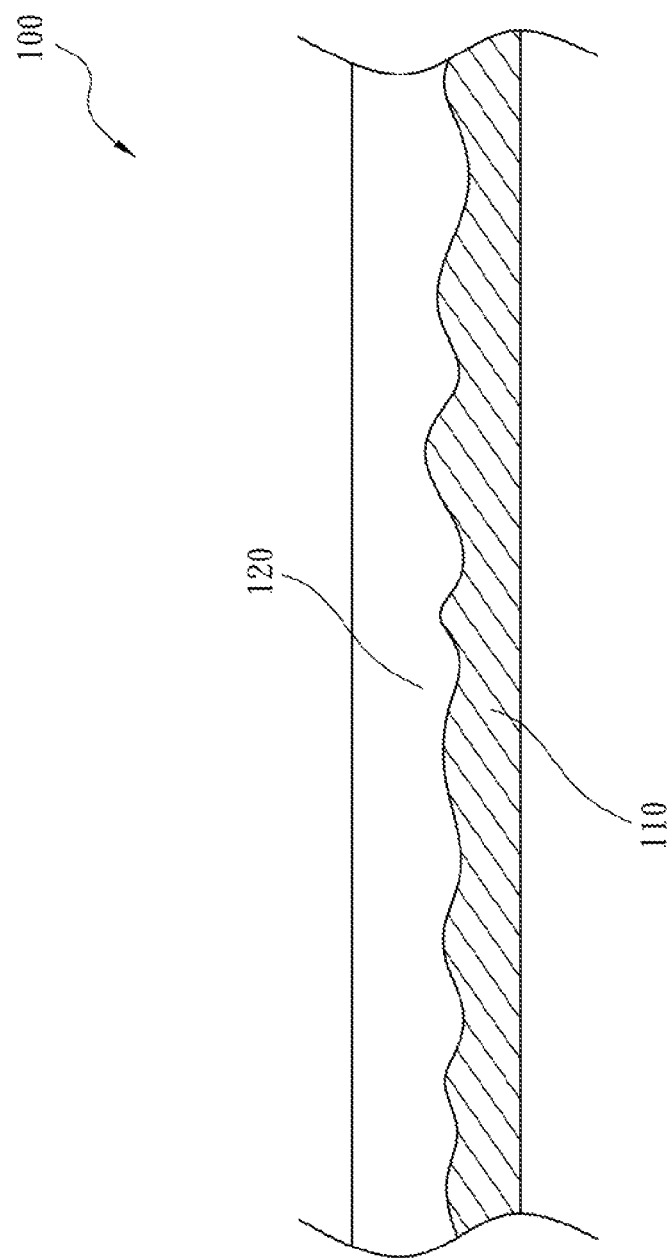
FIG. 3 is a cross-sectional view of a waterproof paper according to one embodiment of the present disclosure.

FIG. 3 is a cross-sectional view of a biodegradable waterproof paper according to one embodiment. The biodegradable waterproof paper 100 includes a paper 110 and a PLA film 120. The PLA film 120 is coated on at least one surface of the paper 110 and infiltrates into the fibers of the paper 110.

The PLA film 120 is formed by coating a PLA solution on the surface of the paper 110. The composition of the Biodegradable glue is diluted from a stock solution includes 1-85 wt % of PLA and 15-99 wt % of a solvent.

According to one or more embodiment of the disclosure, the solvent of the PLA solution is alcohol, ketone, ether or ester. The PLA solution can infiltrate into the paper, so that the formed PLA film cannot be peeled from the paper.

According to one embodiment, the PLA solution above can further include a modifier, such as ethyl acetate, beeswax, sorbitol, natural rosin esters, or any combinations thereof.

According to another embodiment, the PLA solution above can further include a surfactant, and the hydrophile-lipophile balance value of the surfactant in a range from 3 to 14.

According to one embodiment, the PLA film is transparent. According to another embodiment, the PLA film contains a pigment and a thickener. The colored PLA film can be coated on a paper by a gravure process.

Method and Device for Manufacturing Biodegradable Waterproof Paper

Method and devices for manufacturing biodegradable waterproof paper are discussed below.

Figure 4:
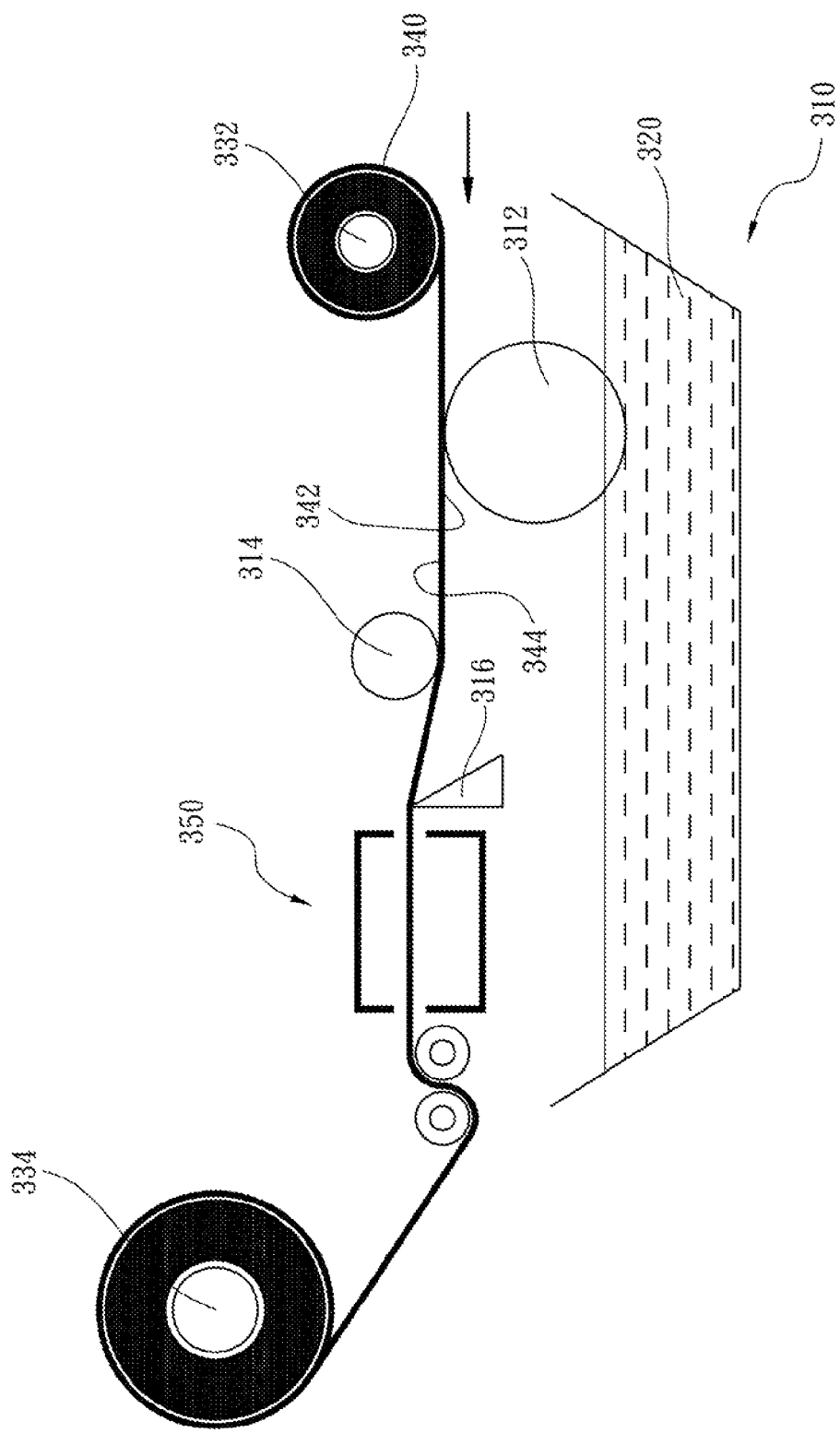
FIG. 4 is an operational scheme of a device for manufacturing the biodegradable waterproof paper of FIG. 3.

FIG. 4 is an operational scheme of a device for manufacturing biodegradable waterproof paper of FIG. 3. In FIG. 4, the device for manufacturing biodegradable waterproof paper comprises a coating device, a paper transporter, and a scraper 316 for removing excess PLA solution. The coating device above includes a liquid tank 310, a first roller 312, a second roller 314, and a dryer 350. The paper transporter above includes a first scroll 332 and a second scroll 334.

A PLA solution 320 is loaded in the liquid tank 310. The PLA solution 320 is a transparent solution diluted from a stock solution includes 1-85 wt % of polylactic acid and 15-99 wt % of a solvent. According to one or more embodiments, the solvent can be alcohol, ketone, ether, or ester.

At least one portion of the first roller 312 is immersed into the PLA solution 320 to be wet by the PLA solution 320. Two ends of a paper 340 are held and tensed by the first scroll 332 and the second scroll 334. The paper 340 is transported along the arrow's direction to pass through the coating device.

A first surface 342 of the paper 340 contacts with the first roller 312 and a second surface 344 contacts with the second roller 314. The height of the second roller 314 may be adjusted to determine the contact area of the paper 340 and the first roller 312. For example, if the second roller 314 is adjusted to lower than the first scroll 332, a larger contact area between the paper 340 and the first roller 312 can be obtained. The larger contact area of the paper 340 and the first roller 312 can reduce the coating time of the coating process. The PLA solution 320 on the first roller 312 can be transfer to the first surface 342 of the paper 340 when the paper 340 passed through the first roller 312, and the PLA solution 320 may infiltrate into the fibers of the paper 340.

For removing and recycling the excess PLA solution 320, a scraper 316 positioned near the paper 340 can be used to scrape the excess PLA solution 320 from the first surface 342 of the paper 340. The scraping operation can reduce the wasting amount of the PLA solution and obtain an extremely thin PLA film on the paper. The dryer 350 then dries the PLA solution 320 coated on the paper 340 to remove the solvent and water contained therein. The formed biodegradable waterproof paper was collected by the second scroll 334.

Figure 5:
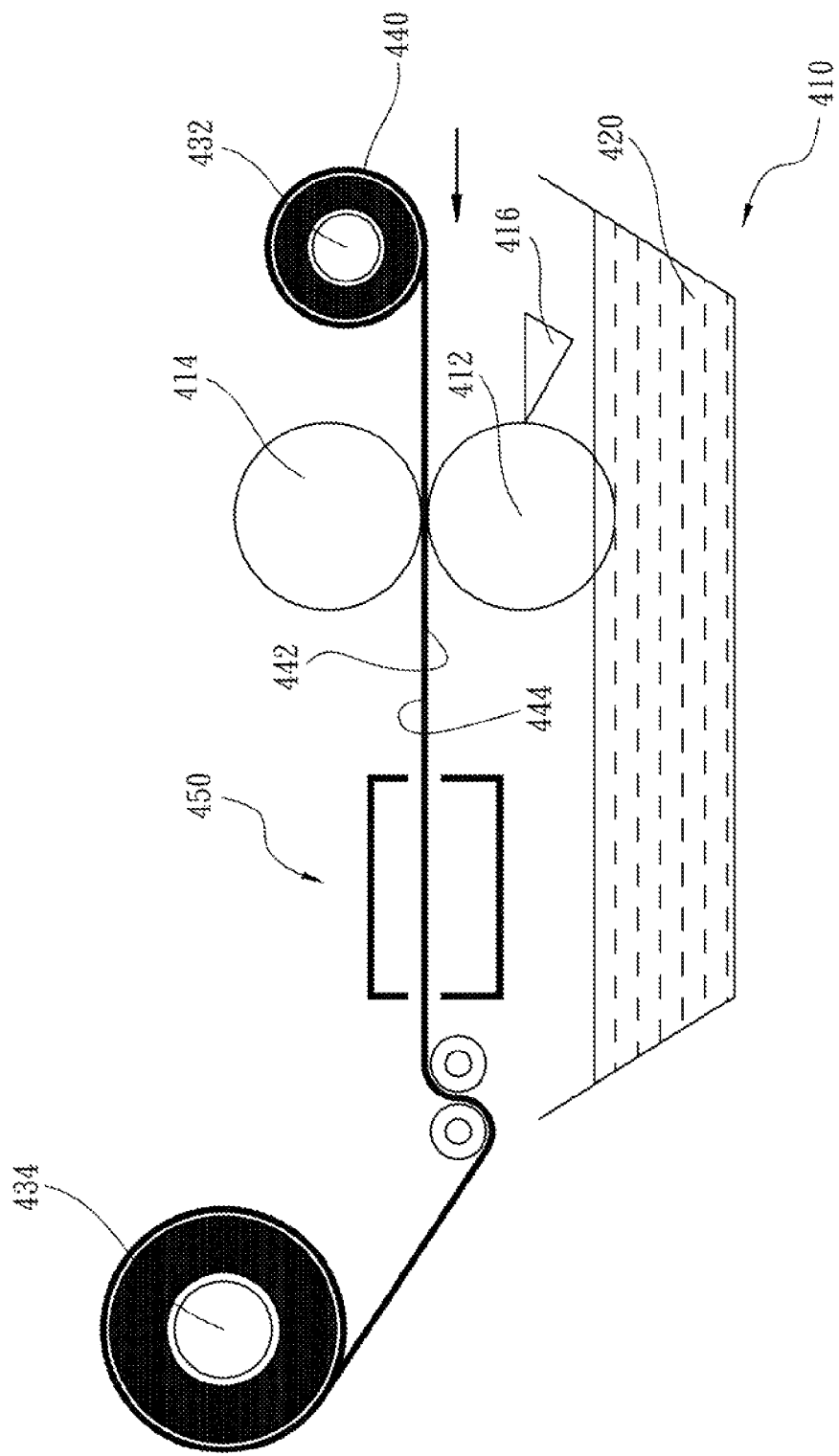
FIG. 5 is an operational scheme of another device for manufacturing the biodegradable waterproof paper of FIG. 3.

FIG. 5 is an operational scheme of another device for manufacturing the biodegradable waterproof paper of FIG. 3. In FIG. 5, the device for manufacturing biodegradable waterproof paper also comprises a coating device, a paper transporter, and a scraper 416 for removing excess PLA solution. The coating device above includes a liquid tank 410, a first roller 412, a second roller 414 on top of the first roller 412, and a dryer 450. The paper transporter above includes a first scroll 432 and a second scroll 434. In FIG. 5, only the is positions of the second roller 414 and the scraper 416 are different from the positions of the second roller 314 and the scraper 316 in FIG. 4.

Similarly, a PLA solution 420 is loaded in the liquid tank 410, and at least one portion of the first roller 412 is immersed into the PLA solution 420 to be wet by the PLA solution 420. However, since the position of the scraper 416 is located near the first roller 412, the excess PLA solution 420 on the first roller 412, rather on the first surface 442 of the paper 440, can be removed by the scraper 416.

Also similarly, two ends of a paper 440 are held and tensed by the first scroll 432 and the second scroll 434 to pass through the coating device. The paper 340 is transported along the direction of the arrow. The first scroll 432 and the second scroll 434 transport the paper 440 through the space between the first roller 412 and the second roller 414.

However, since the second roller 414 is positioned on top of the first roller 412, the second contact position of the second roller 414 and the second surface 444 of the paper 440 is on the top of the first contact position of the first roller 412 and the first surface 442 of the paper 440. Therefore, when the first roller 412 dips the PLA solution 420 and transfer onto the first surface 442 of the paper 440, the second roller 414 can directly apply pressure to the paper 440 to evenly distribute the PLA solution 420 along the first contact position of the first roller 412 and the first surface 442.

After the paper passed through the coating device, the PLA solution 420 is coated on the paper 340 and infiltrates into the fibers of the paper 340. The dryer 450 then dries the film of PLA solution 420 coated on the paper 440 to remove the solvent and water contained therein. The formed biodegradable waterproof paper was collected by the second scroll 434.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing biodegradable waterproof paper, comprising:
   providing a coating device including a liquid tank, a first roller, and a second roller;
   loading a PLA solution in the liquid tank;
   immersing at least one portion of the first roller into the PLA solution;
   providing a paper transporter including a first scroll and a second scroll to hold and tense the two ends of a paper, wherein the paper possesses two opposite surfaces; and
   transferring the PLA solution onto the first surface of the paper and infiltrating the fibers of the paper by moving the first roller, wherein the first roller and the second roller respectively contact with the first surface and the second surface of the paper, the contact area of the first surface with the first roller is determined by adjusting the heights of the second roller.

2. The method of claim 1, further comprising scraping the excess PLA solution from the first roller by using a scraper.

3. The method of claim 2, further comprising scraping the excess PLA solution from the first surface of the paper by using a scraper.

4. The method of claim 2, further comprising drying the PLA solution coated on the first surface of the paper.

5. The method of claim 2, wherein the PLA solution is diluted from a stock solution comprises from 1 to 85 wt % of polylactic acid, and from 15 to 99 wt % of a solvent.

6. The method of claim 5, wherein the solvent is alcohol, ketone, ether or ester.

7. The method of claim 5, wherein the PLA solution comprising a modifier.

8. The method of claim 7, wherein the modifier is selected from the group consisting of ethyl acetate, beeswax, sorbitol, natural rosin esters, and combinations thereof.

9. The method of claim 5, wherein the PLA solution comprises a surfactant with hydrophile-lipophile balance value in range from 3 to 14.

* * * * *